E. J. SULLIVAN & H. P. BOAK.
LUBRICATOR.
APPLICATION FILED OCT. 26, 1917.
1,292,138.
Patented Jan. 21, 1919.
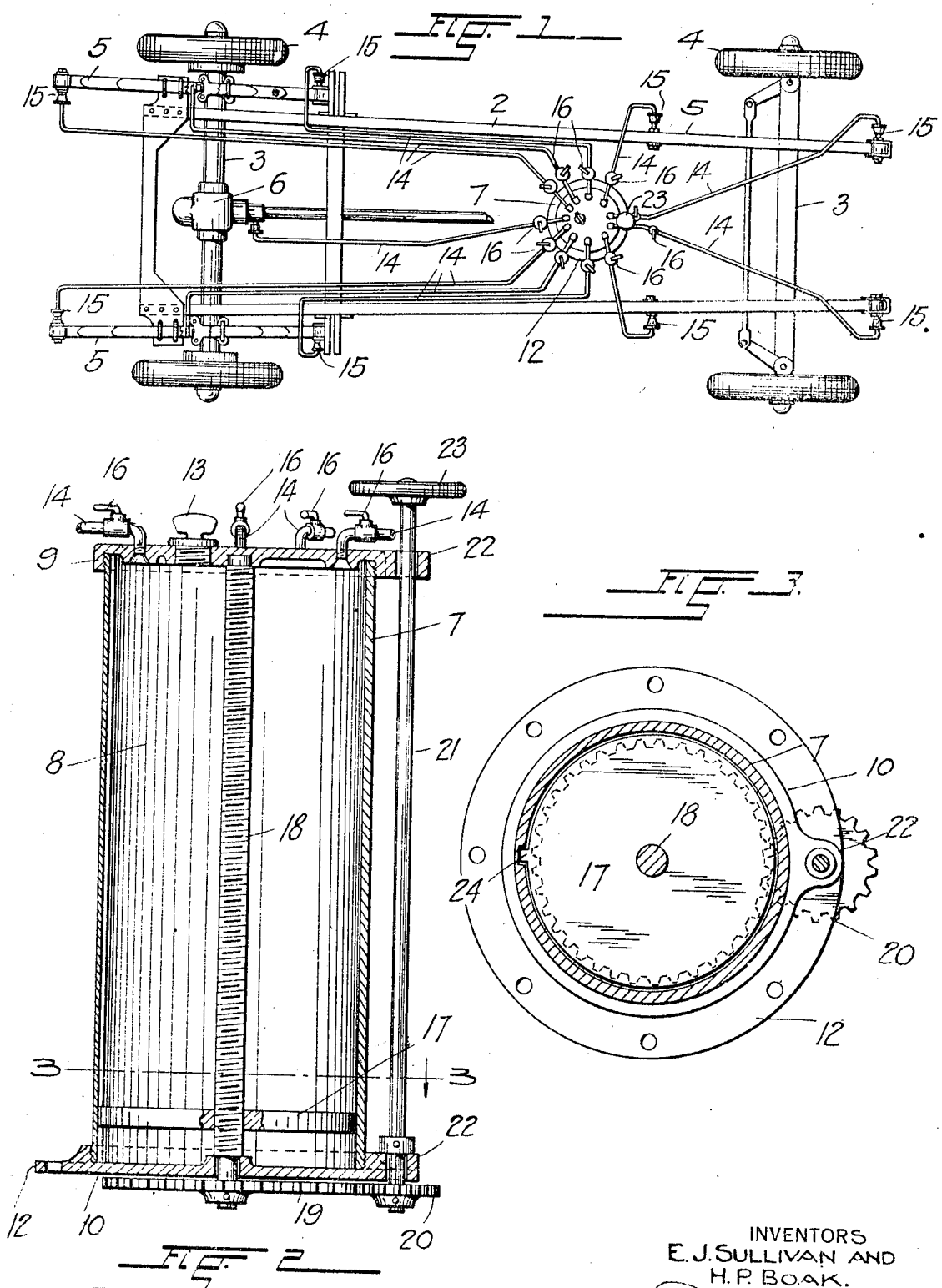
INVENTORS
E. J. SULLIVAN AND
H. P. BOAK.
ATTORNEY

UNITED STATES PATENT OFFICE.

EDWARD J. SULLIVAN AND HOWARD P. BOAK, OF DENVER, COLORADO.

LUBRICATOR.

1,292,138.   Specification of Letters Patent.   Patented Jan. 21, 1919.

Application filed October 26, 1917. Serial No. 198,597.

*To all whom it may concern:*

Be it known that we, EDWARD J. SULLIVAN and HOWARD P. BOAK, citizens of the United States, residing at Denver, in the county of Denver and State of Colorado, have invented certain new and useful Improvements in Lubricators, of which the following is a specification.

Our invention relates to lubricators and its primary object resides in providing a system of devices by which any one of a number of separate parts of a motor-driven vehicle or other apparatus, may be supplied with a lubricant from one fixed point.

With this object in view our invention comprises a reservoir which by means of flexible or rigid tubes is connected with openings in the bearings or other parts to be lubricated.

The reservoir is equipped with a hand-operated mechanical appliance to force its contents into the tubes which are provided with cocks placed in close proximity to the reservoir to control the passage of lubricant to the machine parts with which the tubes connect.

While our lubrication system is designed more particularly for use on automobiles and other self-propelling vehicles, it may be effectively employed on stationary engines and machines or it may be installed to lubricate any one of a number of different machines or tools in a plant or workshop.

An embodiment of our invention has been shown in the accompanying drawings in the various views of which like parts are similarly designated, and in which—

Figure 1 is a plan view of the chassis of an automobile equipped with our improved lubricating system, Fig. 2, an enlarged vertical section through the reservoir of the system, and Fig. 3, a transverse section taken along the line 3—3, Fig. 1.

Referring more specifically to the drawings, the reference numeral 2 designates the chassis of an automobile including its accessories for propulsion, such as the axles 3, the wheels 4 the springs 5, the differential 6, etc.

The reservoir 7 of our lubricating system may be located at any convenient point of the vehicle at which its operative parts are readily accessible. The reservoir is preferably composed of an upright cylinder 8 closed at its upper end by a screw top 9 and screwed within an upstanding rim of a base 10 provided with a flange 12 by which the reservoir is secured to the part upon which it is supported.

The size of the reservoir varies in accordance with the number of bearings or joints which are supplied with lubricant therefrom and its top is, for convenience, provided with a feed-opening which normally is closed by a screw-plug 13.

The bearings and joints of the different parts assembled on the chassis of the motor-vehicle are provided with the usual oil-holes and the reservoir has within its cover a corresponding number of openings which are separately connected with the oil holes by means of tubes 14.

The connections between the tubes and the oil-holes are preferably established through the intermediary of nipples 15 which permit of cleaning the parts when necessary, and the tubes, which may be rigid or flexible, are each provided in adjacency to the points of their connection with the reservoir, with cocks 16 which control the flow of lubricant from the reservoir to the parts to be lubricated.

A piston 17 slidably fitted in the reservoir is mounted for reciprocation upon a feed screw 18 which is rotatably supported in bearings in the axle of the cylinder.

The screw which extends through the base of the reservoir carries below the same a gear-wheel 19 which meshes with a pinion 20 on a driving shaft 21 mounted in bearings 22 which, for convenience in construction, may form part of the base and the top of the reservoir.

The shaft 21 is provided at its upper end with a hand-wheel 23 to facilitate its manual rotation and the piston has a projecting spline 24 which moves in a longitudinally extending groove of the cylinder to hold the piston against rotation during the rotary motion of the feed-screw.

In the use of our lubricating system, the reservoir is filled with a lubricant through its feed-opening after the piston has been moved to a position adjacent the base.

The bearings and joints with which the tubes are connected are initially supplied with the lubricant by opening the cocks 16 and moving the piston upwardly in the reservoir by rotation of the shaft 21 to force the lubricant contained in the reservoir, into and through the tubes.

After all the bearings and joints have thus been supplied with the desired quantities of lubricant, the cocks are closed to be opened separately whenever an additional supply of lubricant is required.

It will thus be seen that by the use of our system, any one or more of a number of separate joints and bearings may be separately or simultaneously supplied with lubricant from one and the same point by merely opening the respective cock or cocks and turning the hand-wheel 23 until the desired quantity of lubricant has been fed into the opened tube or tubes.

The time-taking labor of separately inspecting, removing and filling each grease- or oil-cup of a motor-vehicle or other apparatus is thus avoided and the work of lubricating its moving parts is by the use of our invention simplified to the extent that it may be accomplished within the minimum of time by any person without practical knowledge and without the objectionable soiling of the hands and clothes, which is a constant source of annoyance in the present method of lubrication.

It will be readily understood that in case a thin liquid, such as a light lubricating oil, is used its feed may be accomplished by gravity and without the use of mechanical forcing devices such as that hereinbefore described.

Our system is, however, particularly adapted for the supply of lubricant such as grease or very heavy oils and as such it requires the use of a hand-operated feed mechanism to force the lubricant through the tubes and onto the bearings or joints with which they connect.

While we have shown and described with particularity only one preferred form of our invention, we do not desire to be limited to the exact structural details thereof since variations in the arrangement and construction of the parts may be made without departing from the spirit of our invention as defined in the appended claim.

We claim—

In combination with a motor-driven vehicle, a reservoir mounted thereon, a series of conduits separately connected with the reservoir for the conveyance of its contents to points on the vehicle remote therefrom, hand-operated mechanism for forcing a lubricant contained in the reservoir into the conduits, and manually adjustable cocks controlling the passage of the lubricant through the conduits in close proximity to the reservoir, whereby from a single point of operation on the vehicle the lubricant contained in the reservoir may be forced through any one or more selected conduits of the series, exclusive of the others.

In testimony whereof we have affixed our signatures in presence of two witnesses.

EDWARD J. SULLIVAN.
HOWARD P. BOAK.

Witnesses:
G. J. ROLLANDET,
L. RHOADES.